US012685883B2

(12) United States Patent
Emonin

(10) Patent No.: US 12,685,883 B2
(45) Date of Patent: Jul. 21, 2026

(54) ROPING HARNESS WITH VENTRAL SUSPENSION POINT

(71) Applicant: ZEDEL, Crolles (FR)

(72) Inventor: Simon Emonin, Crolles (FR)

(73) Assignee: ZEDEL, Crolles (FR)

( * ) Notice: Subject to any disclaimer, the term of this patent is extended or adjusted under 35 U.S.C. 154(b) by 771 days.

(21) Appl. No.: 18/104,591

(22) Filed: Feb. 1, 2023

(65) Prior Publication Data

US 2023/0241430 A1 Aug. 3, 2023

(30) Foreign Application Priority Data

Feb. 1, 2022 (FR) ...................................... 2200901

(51) Int. Cl.
*A62B 35/00* (2006.01)

(52) U.S. Cl.
CPC ...... *A62B 35/0018* (2013.01); *A62B 35/0031* (2013.01)

(58) Field of Classification Search
CPC . A62B 35/00; A62B 35/0018; A62B 35/0031; A62B 35/0037; A62B 35/0006
See application file for complete search history.

(56) References Cited

U.S. PATENT DOCUMENTS

| | | | | |
|---|---|---|---|---|
| 10,112,064 | B2 * | 10/2018 | Bouquier ........... | A62B 35/0025 |
| 10,232,199 | B2 * | 3/2019 | Perner ................ | A62B 35/0037 |
| 10,781,848 | B2 * | 9/2020 | Cowell .................. | A63B 29/02 |
| 10,799,732 | B2 * | 10/2020 | Bouquier ........... | A62B 35/0006 |
| 11,369,816 | B2 * | 6/2022 | Carrasca ............ | A62B 35/0037 |
| 11,534,633 | B2 * | 12/2022 | Cowell .............. | A62B 35/0012 |
| 2017/0291046 | A1 | 10/2017 | Bouquier | |
| 2017/0291047 | A1 | 10/2017 | Bouquier | |
| 2018/0345053 | A1 | 12/2018 | Bouquier et al. | |
| 2019/0069644 | A1 * | 3/2019 | Hetrich ............. | A62B 35/0037 |

FOREIGN PATENT DOCUMENTS

| | | | | |
|---|---|---|---|---|
| EP | 3 162 411 A1 | 5/2017 | | |
| EP | 3919139 A1 * | 12/2021 | ......... | A62B 35/0037 |
| FR | 3 049 870 A1 | 10/2017 | | |

* cited by examiner

*Primary Examiner* — David E Martinez
(74) *Attorney, Agent, or Firm* — Oliff PLC

(57) ABSTRACT

A roping harness comprises a belt and leg loops joined by a leg loop connection. A connector keeps the belt and the pair of leg loops together, the latter each passing through a connection ring of the connector. The belt and leg loop connection are movable with respect to one another and with respect to the body. The connector has a body, a rotation shaft and a first D-ring mounted rotatable with respect to the body around the rotation shaft. The first D-ring pivots around an axis of rotation parallel to a direction passing through the connection ring. The first D-ring is connected to the body by means of the rotation shaft fixedly mounted on the body.

12 Claims, 5 Drawing Sheets

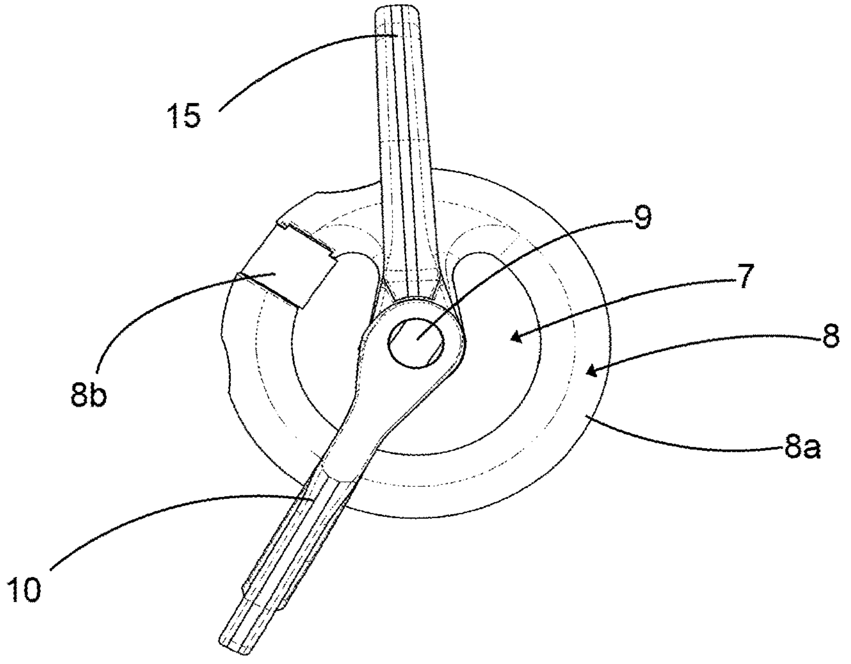
FIG. 3
FIG. 4
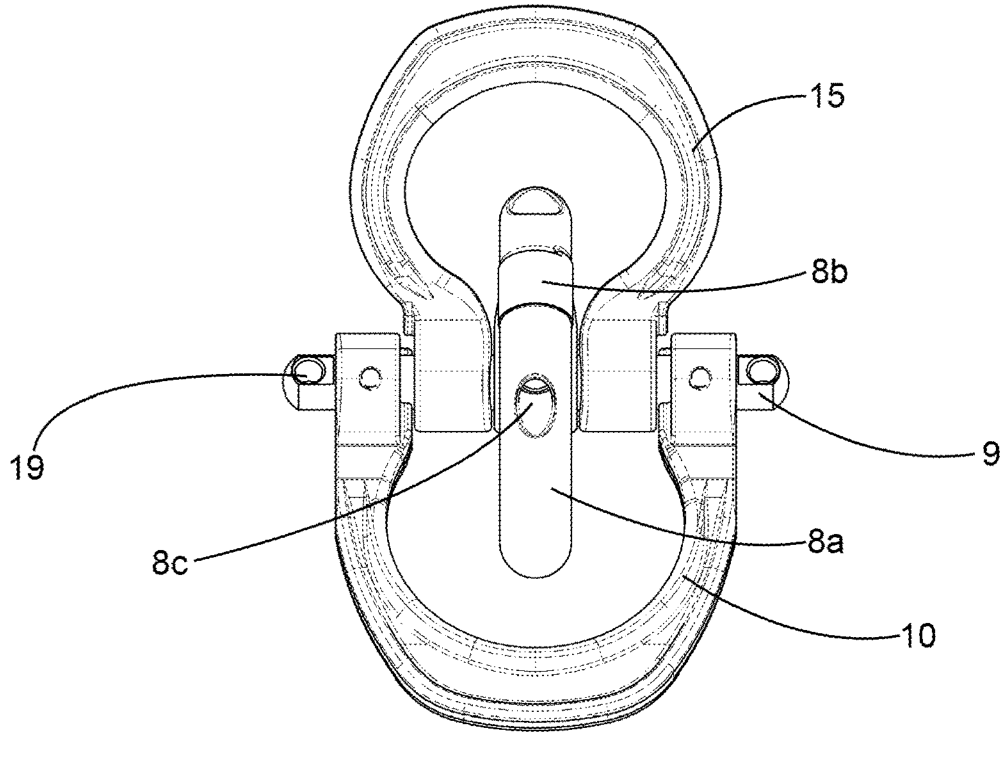

FIG. 5
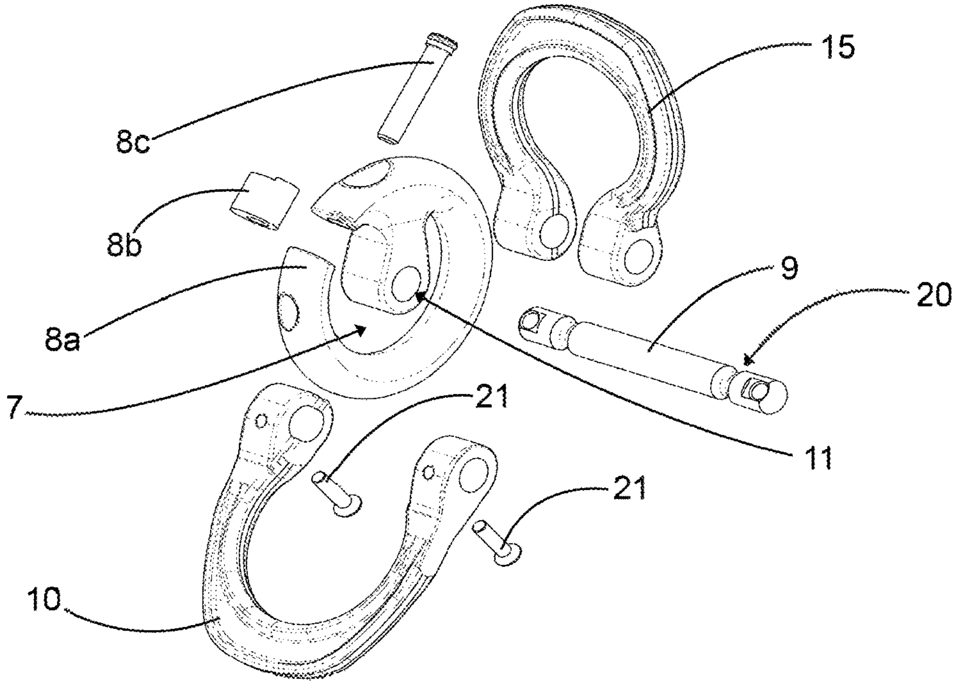
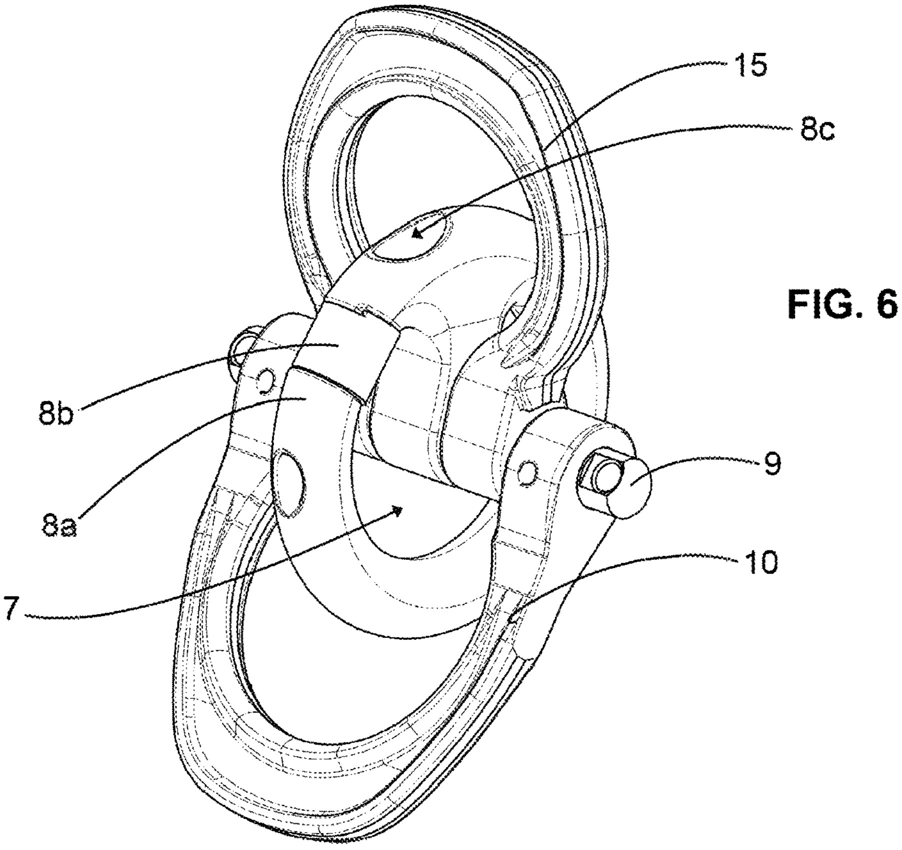
FIG. 6

FIG. 7A
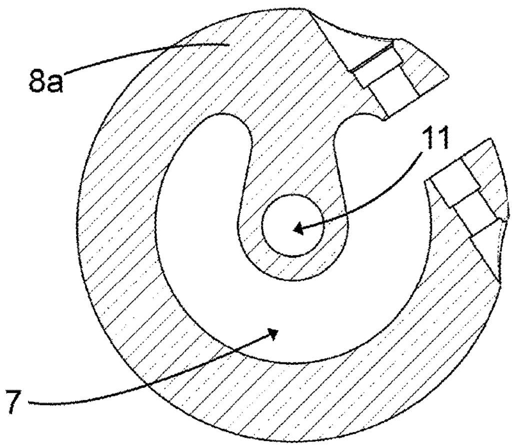
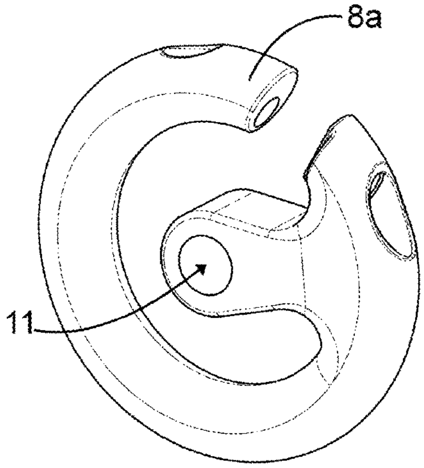
FIG. 7B
FIG. 8
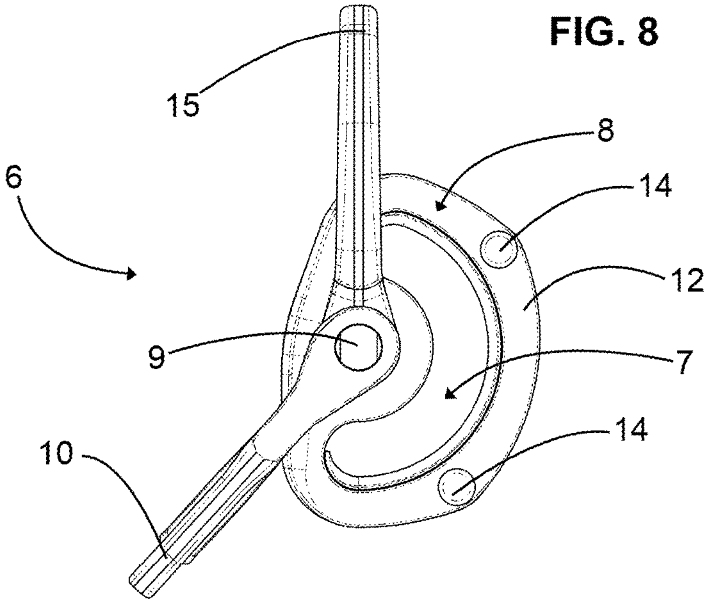
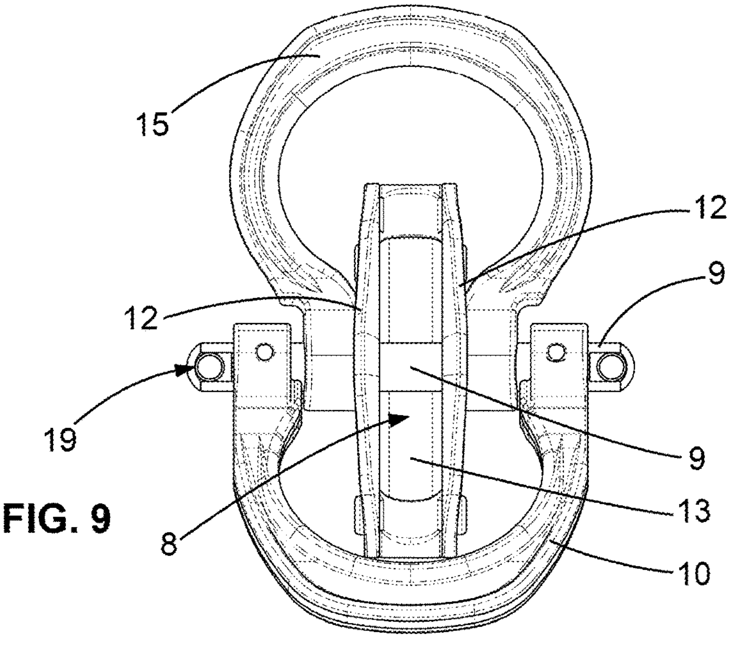
FIG. 9

ROPING HARNESS WITH VENTRAL SUSPENSION POINT

BACKGROUND OF THE INVENTION

The invention relates to a roping harness.

STATE OF THE ART

In a large number of activities such as mountaineering, rock climbing and work at heights, it is conventional to use a roping harness. The roping harness has a ventral suspension point that is easily accessible for the user and that enables the user to be suspended while allowing him the possibility of taking action as regards his suspension. It is particularly advantageous to use one's ventral suspension point in association with a descender and with a rope ascent device. It is therefore necessary to have a ventral suspension point that is very versatile without however being very bulky.

It is known from the document US 2017/0291046 and from the document US 2018/0345053 to form a ventral point formed by two rings that are fitted rotatable around a single rotation shaft. The rotation shaft is fixed on the belt strap so as to form an attachment point above the belt.

This configuration is advantageous but it generally places the ventral suspension point facing the user's navel which may be uncomfortable when the latter has to lean forwards. This also results in this configuration not being very pleasant during walking phases.

SUMMARY OF THE INVENTION

One object of the invention consists in providing a roping harness that is more user-friendly in particular during position change phases and/or during walking phases.

These shortcomings tend to be solved by means of a roping harness that comprises:

- a pair of leg loops and a belt, the leg loops of the pair of leg loops being connected by a leg loop connection;
- a connector keeping the belt and the pair of leg loops together, the leg loop connection and the belt both passing through a first connection ring defined by the connector, the belt and the leg loop connection both being movable inside the first connection ring and movable with respect one another.

The roping harness is remarkable in that:

- the connector has a body, a rotation shaft and a first D-ring fitted rotatable with respect to the body around the rotation shaft, the first D-ring pivoting around an axis of rotation that is parallel to a direction passing through the first connection ring;
- the first D-ring is connected to the body by means of the rotation shaft;
- the rotation shaft is mounted fixedly on the body.

According to one feature of the invention, the connector defines a second connection ring distinct from the first connection ring, the second connection ring housing the rotation shaft.

In preferential manner, the rotation shaft is mounted removable with respect to the body.

Advantageously, the connector is made from a material that is more rigid than the belt and the leg loop connection.

In a preferential embodiment, the first connection ring has an inner lateral surface that is concave, preferably semi-circular, the inner lateral surface being separated from the rotation shaft by an empty area of the first connection ring in a cross-sectional observation perpendicularly to the axis of rotation, the inner lateral surface defining the through hole receiving the belt and the leg loop connection.

It is also advantageous to provide a configuration in which the first connection ring has an inner lateral surface presenting the shape of an arc of a circle in a cross-sectional observation perpendicularly to the axis of rotation.

In preferential manner, the rotation shaft passes through the centre of the arc of a circle.

In an advantageous embodiment, the connector is of convex external portion and preferentially in the form of an arc of a circle in a cross-sectional observation perpendicularly to the axis of rotation.

In an advantageous configuration, the first connection ring is non-openable.

Preferentially, the first D-ring and a second D-ring are fitted on the rotation shaft and are each fitted rotatable around the rotation shaft.

In a particular embodiment, the connector has a body with a main part and a secondary part, the secondary part being mounted removable with respect to the main part to form an openable body and to enable a tool to be inserted in or extracted from the first connection ring.

In another development, the connector has a body formed by two flanges and a spacer separating the two flanges, the rotation shaft connecting the two flanges and being accessible between the two flanges.

DESCRIPTION OF THE DRAWINGS

Other advantages and features will become more clearly apparent from the following description of particular embodiments and implementation modes of the invention given for non-restrictive example purposes only and represented in the accompanying drawings, in which:

FIG. 3 schematically illustrates a side view of a first embodiment of a connector designed to form a ventral suspension point;

FIG. 4 schematically illustrates a front view of the first embodiment of a connector designed to form a ventral suspension point;

FIG. 5 schematically illustrates an exploded view of the first embodiment of a connector designed to form a ventral suspension point;

FIG. 6 schematically illustrates a perspective view of the first embodiment of a connector designed to form a ventral suspension point;

FIGS. 7A and 7B schematically illustrate a cross-sectional view and a perspective view of the body of the connector according to the first embodiment;

FIG. 8 schematically illustrates a side view of a second embodiment of a connector designed to form a ventral suspension point;

FIG. 9 schematically illustrates a front view of the second embodiment of a connector designed to form a ventral suspension point;

DETAILED DESCRIPTION

Figure 1:
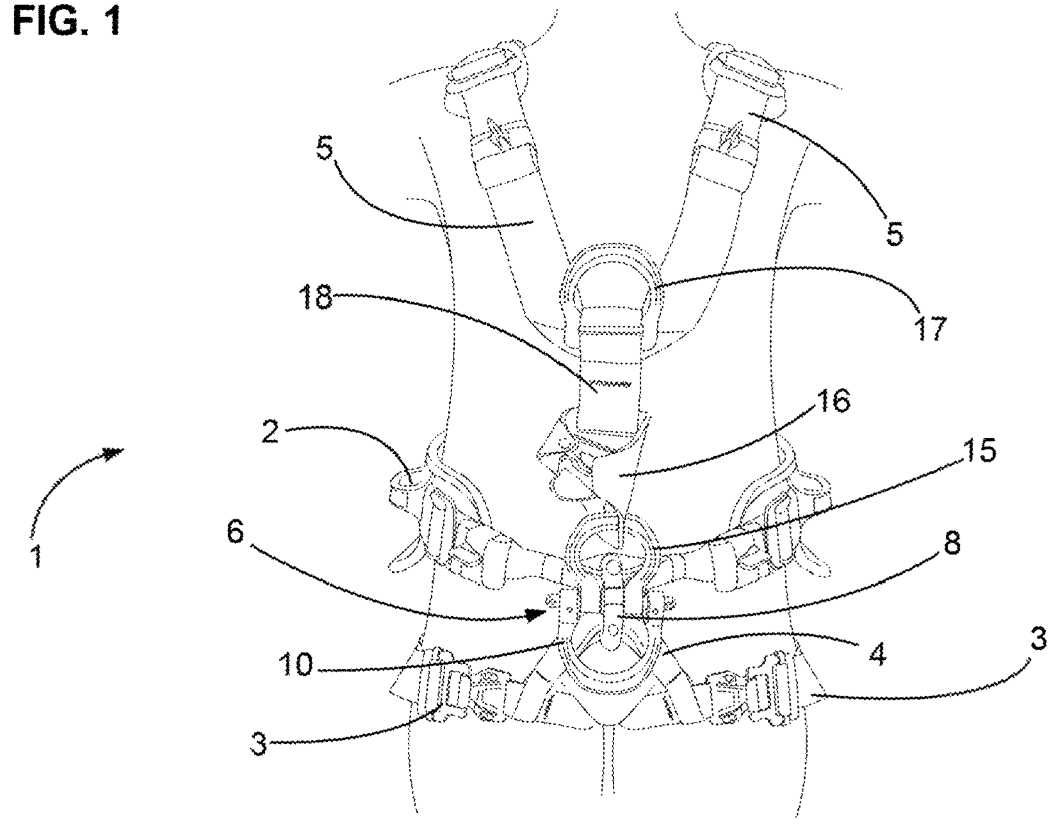
FIG. 1 schematically illustrates a view of a roping harness comprising a ventral suspension point according to the invention.
Figure 2:
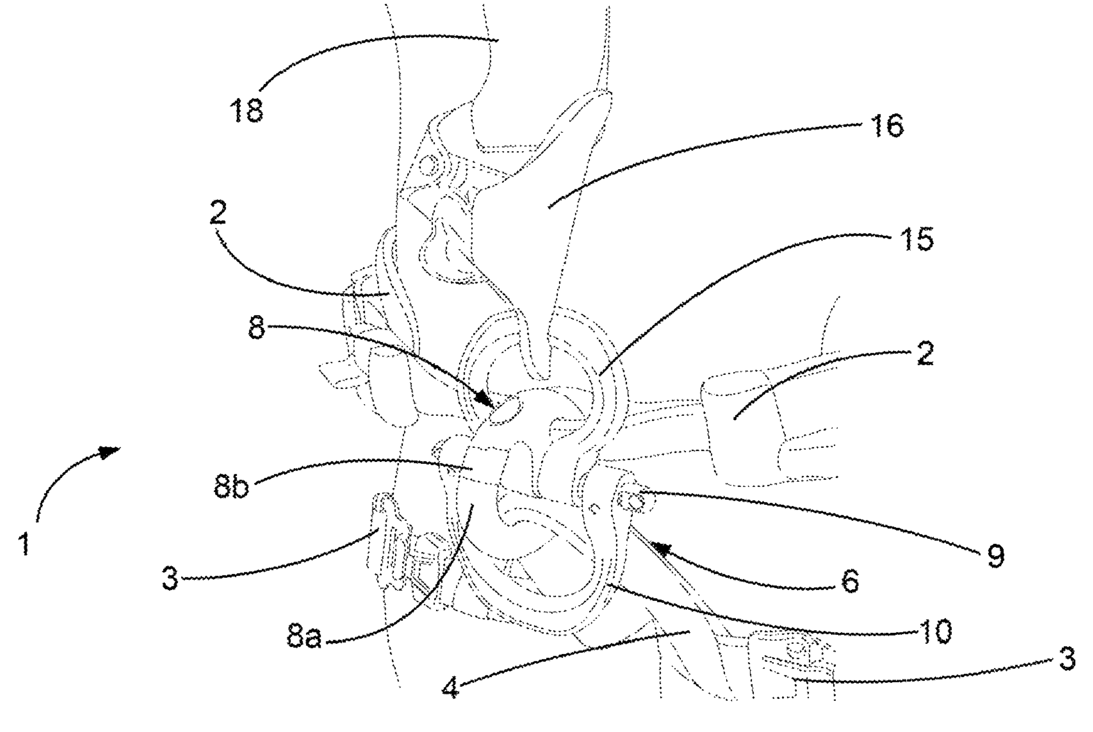
FIG. 2 schematically illustrates an enlarged view of the ventral suspension point according to the invention.

FIGS. 1 and 2 illustrate a roping harness 1 comprising an improved ventral suspension point. The harness 1 comprises a belt 2 and a pair of the leg loops 3 joined to one another by a leg loop connection 4, for example in the form of a strap or a cord. The belt 2 is designed to pass round the user's waist. The two leg loops 3 each pass round a thigh and are mechanically connected to one another by the leg loop connection 4 that defines a maximum separating distance between the leg loops 3. According to the configurations, the leg loops 3 can be openable or not, i.e. have or not have a device for opening and closing leg loop 3. It is also possible for the circumference of the leg loops 3 to be adjustable or for the circumference to be fixed, i.e. to be non-adjustable.

The harness 1 is a roping harness, i.e. a harness configured to support a user suspended by means of the harness. The harness 1 can be a harness for mountaineering, for work at heights, for tree care or for canyoning.

Depending on the embodiments, the harness 1 can have or not have shoulder straps 5. In the particular embodiment illustrated in FIG. 1, the harness 1 comprises shoulder straps 5. The harness 1 can comprise removable shoulder straps 5 or unremovable shoulder straps 5. In certain embodiments, the shoulder straps 5 are fixed directly to the belt 2, and in other embodiments, the shoulder straps 5 are fixed indirectly to the belt 2, i.e. the mechanical connection between the shoulder straps 5 and the belt 2 is made by means of an intermediate part.

The harness 1 comprises a ventral suspension point enabling the mechanical connection to be made between an attachment point and the rest of the harness 1 when the user is suspended in the harness 1. More precisely, the ventral suspension point is formed by a connector 6 that performs the mechanical connection between the belt 2 and the two leg loops 3.

In one embodiment, the harness 1 can be devoid of opening/closing means of the belt 2, the harness having only a means for adjusting the circumference of the belt 2. If the harness 1 comprises opening/closing means of the belt 2, for example with metal loops or clip-fastening systems, the ventral suspension point is distinct from the opening/closing means of the belt 2.

The harness 1 comprises a connector 6 that defines a first connection ring 7, i.e. a first through hole. As illustrated in the different figures, the through hole can be of any shape, preferably substantially circular or in the shape of an arc of a circle. In a preferential embodiment, the sectional plane that enables the annular configuration of the connector 6 with the first through hole to be observed is the median sagittal plane of the user wearing the harness.

The leg loop connection 4 and the belt 2 each pass through the first connection ring 7. The belt 2 and the leg loop connection 4 are each movable inside the first connection ring 7 and are movable with respect to one another. The first connection ring 7 enables the belt 2 to move with respect to the connector 6 and with respect to the leg loop connection 4 which enables the harness 1 to be more suitable for walking phases. This also enables the connector 6 to be moved to better adjust to the position of the user suspended in his/her harness. The user can be more or less bent over forwards, for example to work in a cramped space. The belt 2 and the leg loop connection 4 extend in a direction perpendicular to the sectional plane.

The connector 6 has a body 8, a rotation shaft 9 and a first D-ring 10. The first D-ring 10 is mounted rotatable with respect to the body 8 around the rotation shaft 9. The first D-ring 10 pivots around an axis of rotation that is parallel to a direction passing through the first connection ring 7 in the through hole that receives belt 2 and the leg loop connection 4. The first D-ring 10 is designed to rotate around an axis of rotation that is preferentially perpendicular to the median sagittal plane of the user wearing the harness. The rotation shaft 9 defines the axis of rotation of the first D-ring 10. As illustrated in the different figures, the first D-ring 10 is attached to the rotation shaft 9 by means of a first attachment point and a second point attachment point that are separated by the body 8. The rotation shaft 9 passes through the body 8. The first D-ring is a "connection D-ring", i.e. a connection element that has a general shape roughly in the form of a "D".

The connector 6 has a rotation shaft 9 that defines an axis of rotation for the first D-ring 10. The axis of rotation defined by the rotation shaft 9 is preferentially the longitudinal axis of the rotation shaft 9, i.e. the axis representing the largest dimension of the rotation shaft 9.

The first D-ring 10 is designed to be connected to the attachment point. In other words, the first D-ring 10 is fixed to the attachment point to ensure suspension of the rest of the harness 1. The attachment point can be a rope, a lanyard, a point of a rock face or any other element suitable for suspending the user. When the user moves, for example he bends over or on the contrary straightens up, the belt 2 is able to move with respect to the leg loop connection 4 inside the first connection ring 7. The belt 2 and the leg loop connection 4 are also able to move with respect to the body 8 of the connector 6. The rotation shaft 9 that provides the mechanical connection between the body 8 and the first D-ring 10 does not move or moves very little which avoids having a ventral suspension point that moves in non-negligible manner when the user straightens up or bends over for example forwards.

The first D-ring 10 is connected to the body 8 by means of the rotation shaft 9 thereby enabling the first D-ring 10 to pivot around the rotation shaft 9 so as to follow the movement of the user's centre of gravity and/or the movements between the belt 2 and the leg loop connection 4 without introducing improper movement of the rest of the connector 6 and in particular of the body 8.

The rotation shaft 9 is fixed to the body 8 so as to have a fixed position. According to the configurations, the rotation shaft 9 can be mounted immovable with respect to the body 8 or it can be mounted rotating around an axis of rotation that passes through the rotation shaft 9 which is preferably the axis of rotation of the first D-ring 10.

In preferential manner, the connector 6 defines a second connection ring 11 distinct from the first connection ring 7. The second connection ring 11 houses the rotation shaft 9. The rotation shaft can rotate inside the second connection ring 11. Preferably, the outer surface of the first connection ring is convex, i.e. devoid of any concave area.

In a particular embodiment, the rotation shaft 9 is mounted removable with respect to the body 8. Removable assembly of the rotation shaft results in a greater freedom in the use of the first D-ring 10 and in fitting of the different tools on the connector 6. The first D-ring 10 is mounted removable with respect to the body 8. In preferential manner, the first D-ring 10 is mounted removable with respect to the body 8 without modifying the first connection ring 7.

Assembly and removal of the first D-ring 10 can be performed while preserving the mechanical connection between the belt 2 and the leg loop connection 4 which results in a gain in user safety.

In particularly advantageous manner, the connector 6 is made from a material that is more rigid than the belt 2 and than the leg loop connection 4. The connector 6 is preferentially made from metallic material or from an assembly of a metallic material and another material, for example a plastic material or a composite material. The connector 6 is preferentially a non-deformable connector, i.e. its deformation is nil or negligible when the user is suspended in the harness.

It is preferable for the connector 6 to keep its shape when subjected to a load, more particularly in the area that defines the shape of the first connection ring 7. In preferential manner, the outer wall of the connector 6 designed to press on the user's abdomen is curved, the curvature being observed along a median sagittal sectional plane of the user when the harness is worn. The curvature of the outer surface of the connector 6 enables the connector 6 to rotate against the abdomen without forming a pressure point. It is possible to form a connector 6 the outer wall of which is an arc of a circle as illustrated in FIGS. 3, 4, 5, 6 and 7. It is also possible to form a curved outer wall which is not the true arc of a circle as illustrated in FIGS. 8 to 11. The outer wall is convex.

In a preferred embodiment illustrated in the different figures, the first connection ring 7 has an inner lateral surface that is concave, preferably semi-circular. The inner lateral surface is separated from the rotation shaft 9 by an empty area of the first connection ring in the cross-sectional observation perpendicularly to the axis of rotation. The concave lateral surface is the surface on which the belt 2 and the leg loop connection 4 slide when they move under load in the first connection ring 7. The concave inner lateral surface is the surface closest to the user's abdomen and it demarcates the first through hole receiving the belt 2 and the leg loop connection 4. When the user bends over or straightens up, this moves the belt 2 with respect to the leg loop connection 4, and the latter can move in the first connection ring 7 which presents a favourable shape for such a movement thereby preventing a pressure point from forming.

In the illustrated embodiments, the side wall of the first connection ring 7 is an arc of a circle facilitating movements. It is even more advantageous for the rotation shaft 9 to pass through the centre of the arc of a circle.

In the configuration illustrated in FIGS. 3 to 6, 7A and 7B, the body 8 is made in two parts with a main part **8*a* and a secondary part 8*b*. The secondary part 8*b* is mounted removable with respect to the main part 8*a* so as to make the first connection ring 7 openable. It is advantageous to form a body 8 with an openable first connection ring 7 so as to be able to fit a tool as close as possible to the axis of rotation so that the transfer of suspension forces between the first D-ring and the tool does not result in too great a modification of the position of the rotation shaft 9** thereby unbalancing the user.

The secondary part **8*b* can be fixed to the main part 8*a* by any suitable means, for example by means of one or more bolts 8*c*** or any other fixing component.

In the embodiment illustrated in FIGS. 8 to 11, the first connection ring 7 is non-openable. Each flange 12 has a through hole designed to receive the belt 2 and the leg loop connection 4. The two through holes are facing one another to define the first connection ring 7. It is also advantageous to separate the two flanges 12 by means of a spacer 13 and to connect the two flanges 12 via the rotation shaft 9. The spacer 13 and the rotation shaft 9 are separated from one another by a space which enables the portion of the rotation shaft 9 located between the two flanges 12 to be functionalised. It is also possible to fit a tool in this space, for example a lanyard. In this way, the tool is directly fixed to the rotation shaft 9. The spacing between the rotation shaft 9 and the spacer enables a tool to be installed around the rotation shaft 9 without impeding movement of belt 3 and the leg loop connection 4 in the first connection ring 7.

In the embodiment illustrated in FIGS. 8 to 11, the body 8 of the connector 6 is formed by two flanges 12 separated by a spacer 13. The two flanges 12 fixed to one another by fixing means 14, for example bolts, screws, or rivets.

It is advantageous to provide for each of flanges 12 to also have a through hole **12*a* designed to receive the rotation shaft 9 so that the rotation shaft 9 can be mounted removable with respect to the body 8 and the rotation shaft 9 is also mounted rotatable with respect to the body 8**.

In a particularly advantageous manner, the connector 6 is provided with a second D-ring 15. The second D-ring 15 is mounted rotatable around the rotation shaft 9. By using a second D-ring 15 rotatable around the rotation shaft 9, it is possible to fix a second tool, for example a rope clamp. In the course of use, the user is suspended by means of the tool fixed to the first D-ring or by means of the tool fixed to the second D-ring 15. Switching of the load from one tool to the other does not result in the attachment point shifting with respect to the user's centre of gravity as the tools rotate around one and the same the rotation shaft 9. The second D-ring is a "connection D-ring", i.e. a connection element that has a general shape roughly in the form of a "D". The D-rings are preferentially metal D-rings.

It is particularly advantageous to provide a harness that has shoulder straps the front portion of which is fixed to one end of a tool 16. The other end of the tool 16 is fixed to the second D-ring 15. The tool 16 is preferentially a rope clamp, for example a clamp of Croll® type.

It is even more advantageous for the point of convergence between the front portions of the shoulder straps 5 to be provided with a third D-ring 17 arranged above the tool 16. The tool 16 and the third D-ring 17 can be joined by a strap 18.

In a preferential embodiment, the rotation shaft 9 is provided at each of its ends with a device for fixing a seat 19. In the embodiment illustrated in the different figures, the device for fixing a seat 19 is formed by two through holes located at the opposite ends of the rotation shaft 9.

It is then possible for the user to fit a seat and to attach it in each of the through holes. In the case of lengthy use, the user can sit on the seat and the force is applied directly in the rotation shaft 9 so that shifting of the user's centre of gravity of use does not result in movement of the ventral attachment point.

Figure 10:
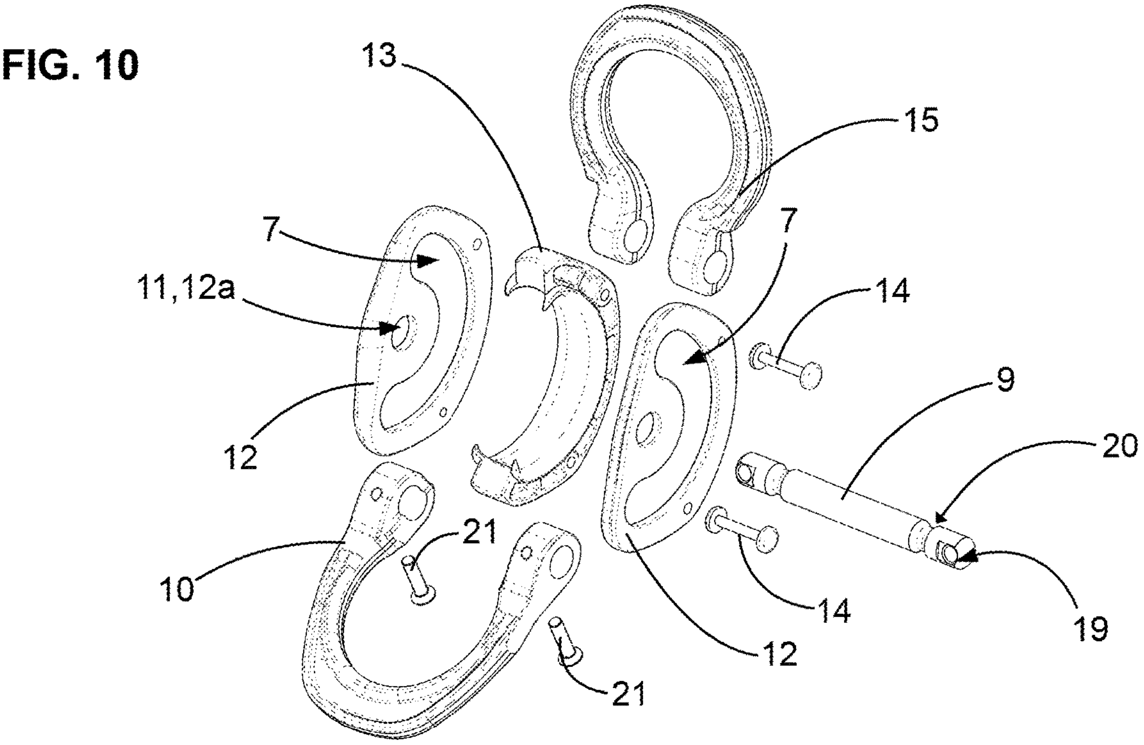
FIG. 10 schematically illustrates an exploded view of the second embodiment of a connector designed to form a ventral suspension point.
Figure 11:
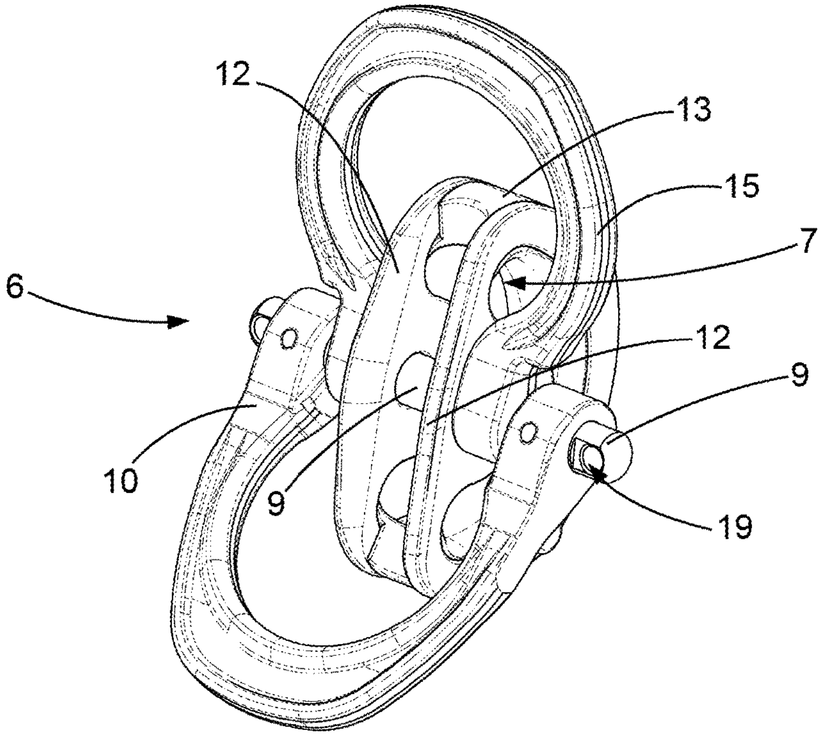
FIG. 11 schematically illustrates a perspective view of the second embodiment of a connector designed to form a ventral suspension point.

In a particular embodiment illustrated in FIG. 5 and in FIG. 10, the rotation shaft 9 is provided with an annular groove 20 that passes right round the rotation shaft 9 around the axis of rotation of the first D-ring 10. The annular groove 20 collaborates with a fixing bolt 21 to secure the first D-ring 10 on the rotation shaft 9 while allowing rotation of the latter with respect to the rotation shaft 9. The fixing bolt 21 can be replaced by any suitable means, for example a nut or a rivet.

The invention claimed is:

1. Roping harness comprising:

a pair of leg loops and a belt, the leg loops of the pair of leg loops being connected by a leg loop connection;

a connector having a body, a rotation shaft and a first D-ring;

wherein the body defines a first through hole and the belt passes through the body via the first through hole;

wherein the body defines a housing for housing the rotation shaft;

wherein the first D-ring is mounted rotatably with respect to the body around the rotation shaft and is connected to the body by means of the rotation shaft;

wherein the leg loop connection and the belt both pass through the first through hole, the body keeping the belt and the pair of leg loops together, the belt and the leg loop connection both being movable inside the first through hole and movable with respect to one another;

wherein the first D-ring is mounted pivotably around an axis of rotation that is parallel to a direction passing through the first through hole.

2. Roping harness according to claim 1 wherein the rotation shaft is mounted removably with respect to the body.

3. Roping harness according to claim 1 wherein the connector is made from a material that is more rigid than the belt and the leg loop connection.

4. Roping harness according to claim 1 wherein the body has an inner lateral surface delineating the first through hole, the inner lateral surface is separated from the rotation shaft in a cross-sectional observation perpendicularly to the axis of rotation, the inner lateral surface defining the through hole receiving the belt and the leg loop connection.

5. Roping harness according to claim 4 wherein the first through hole has the shape of an arc of a circle in a cross-sectional observation perpendicularly to the axis of rotation.

6. Roping harness according to claim 5 wherein the rotation shaft passes through the centre of the arc of a circle.

7. Roping harness according to claim 5 wherein the connector has a convex external cross-section.

8. Roping harness according to claim 7 wherein the convex external cross-section is an arc of a circle in an observation along a sectional plane perpendicular to the axis of rotation.

9. Roping harness according to claim 1 wherein the body is non-openable.

10. Roping harness according to claim 1 wherein the first D-ring and a second D-ring are fitted on the rotation shaft and are each mounted rotatably around the rotation shaft.

11. Roping harness according to claim 1 wherein the body with a main part and a secondary part, the secondary part being mounted removable with respect to the main part to form an openable body and enable a tool to be inserted in and extracted from the first through hole.

12. Roping harness according to claim 1 wherein the connector has a body formed by two flanges and a spacer separating the two flanges, the rotation shaft connecting the two flanges and being accessible between the two flanges.

* * * * *